April 14, 1964  G. LEHNERT  3,128,930
APPARATUS FOR MAKING THIN WALLED CORRUGATED METAL TUBING
Filed May 17, 1962  2 Sheets-Sheet 1

INVENTOR.
GUNTHER LEHNERT
BY
ATTORNEY.

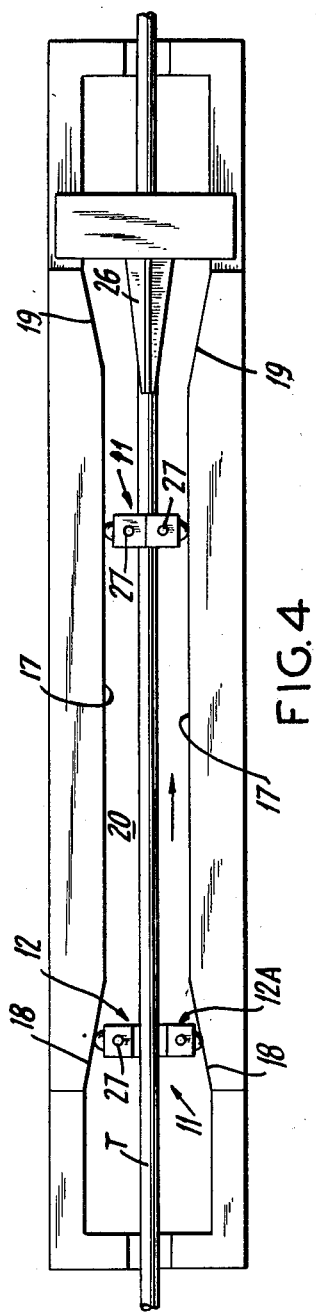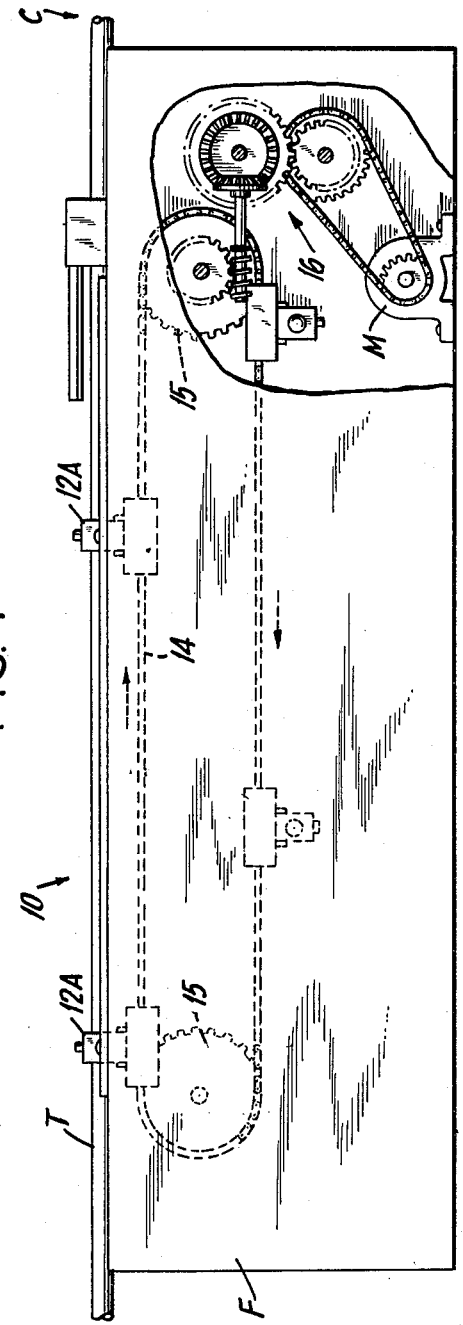

United States Patent Office 3,128,930
Patented Apr. 14, 1964

3,128,930
APPARATUS FOR MAKING THIN WALLED CORRUGATED METAL TUBING
Gunther Lehnert, Hannover-Bothfeld, Germany, assignor to Hackethal Draht und Kabel Werke AG, Hannover, Germany, a corporation of Germany
Filed May 17, 1962, Ser. No. 195,593
6 Claims. (Cl. 226—173)

This invention relates to the manufacture of seam welded, corrugated metal tubing; and more particularly concerns apparatus for making such corrugated tubing, as for cable sheaths.

In applicant's Patent 3,023,300 there is shown means for gripping firmly a freshly welded metal tubing between the welding station and a corrugating station so as to prevent torsional displacement of the tubing as an incident to the corrugating operation. Thus, stresses are avoided which would displace the edges of the metal tubing as the same are being welded, and otherwise prevent the formation of an imperfect longitudinal seam. However, such gripping action must be of a character which, while holding the tubing against incident torsional stresses, still does not become excessive and thereby result in a crushing or deformation of the tubing wall as the same is gripped.

Accordingly, an object of this invention is to provide gripping means applicable to tubing moving between welding and corrugating stations, wherein the clamping jaws of the device are adjustable for variations in the diameter of the tubing being gripped, so as to inhibit crushing of the tubing, yet retaining a firm grip on the tubing to prevent slipping or turning of the tubing.

Another object of this invention is to provide in a device of the character described, means for adjusting the relative position of the sleeves mounted on opposed gripping jaws, to thereby adjust the gripping pressure applied to the engaged tubing.

A further object of this invention is to provide in a device of the character described, improved gripping jaws for engaging tubing as the same moves between welding and corrugating stations, said jaws including means for resiliently adjusting their relative positions, whereby excessive gripping pressures will not be transmitted to the gripped tubing, thereby avoiding crushing or deformation of the gripped tubing.

Other objects of this invention will in part be obvious and in part hereinafter pointed out.

In the drawings FIG. 1 is a transverse sectional view of a tube gripping assembly embodying the invention;

FIG. 4 is a diagrammatic showing in plan view of the gripping device which includes the tube gripping assemblies of this invention; and FIG. 5 is a diagrammatic showing in elevation, with parts cut away, of said device.

Figure 1:
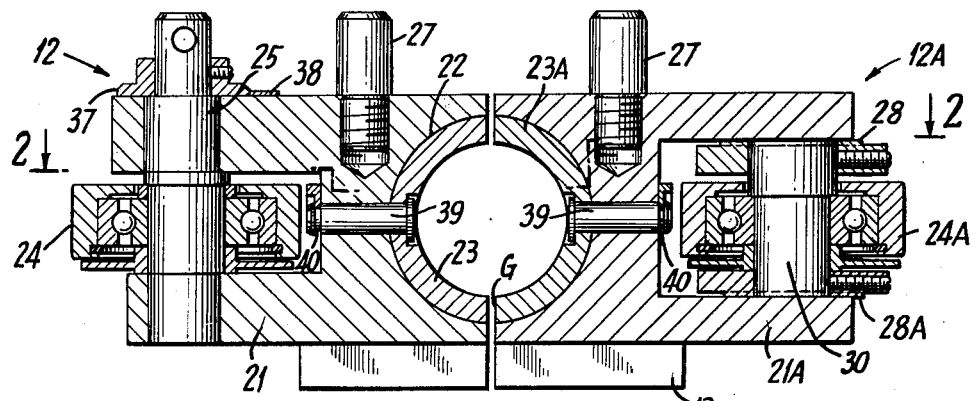

As shown in FIGS. 4, 5, the overall device for gripping freshly welded metal tubing T, as the same moves from a welding station W to a corrugating station C, is generally indicated at 10 and is more fully described in said Patent 3,023,300.

Device 10 includes paired gripping assemblies 11 comprising grippers 12, 12A in opposed relation to each other. Each of said grippers 12, 12A is mounted on a base plate 13 for transverse slidable movement towards and away from each other. The slidable disposition of grippers 12, 12A on plate 13 is detailed in said Patent 3,023,300. Base plates 13 are secured to a pair of parallel, endless sprocket chains 14 which are entrained about longitudinally spaced sprocket wheels 15, driven by a motor M through suitable gearing 16.

The sprocket wheels 15 are suitably mounted in a frame F having an open upper portion defined by opposed rectilinear and parallel edge portions 17; converging edge portions 18 extending to the proximal end of edge portions 17; and diverging edge portions 19 extending from the distal end of edge portions 17.

Thus, the gripping assemblies 11 move through the longitudinal slot 20 formed by frame edges 17, 18, 19, when such assemblies are on the upper run of chains 14. Each gripper 12 comprises essentially a block 21 having a semi-circular cutout 22 to receive therein a gripper sleeve 23 of semicircular shape. Thus, as grippers 12, 12A move toward each other, sleeves 23, 23A also move toward each other to engage the tubing T and to grip the same.

The grippers 12, 12A are moved toward and away from each other at appropriate points in their travel on chains 14, by the camming action of opposed frame edge portions 17, 18 and 19. Thus, each of the blocks 21, 21A is provided with a cut out portion at its outer edge to receive therein rotatable cam followers 24 journalled on vertical shafts 25 mounted in blocks 21. Cam follower 24A is mounted on its block 21A, in a manner hereinafter described.

It will be apparent, from FIGS. 4, 5, that each assembly 11 is moved by chains 14 to assume an upright position in frame slot 20 and grippers 12, 12A will first engage frame edge portions 18 to progressively move grippers 12, 12A toward each other to effect a gripping action on the moving tubing T, which gripping action will continue for the extent of frame edge portions 17. Thereafter, grippers 12, 12A will be moved away from each other by the action of a wedge shaped member 26 fixed to the frame and so located as to engage upstanding studs 27 on the blocks 21, 21A and thus cause outward displacement of the same; such displacement being limited by the action of the cam followers 24 on frame edge portions 19. In this manner tubing T is released as the same passes to the corrugating station C.

Figure 2:
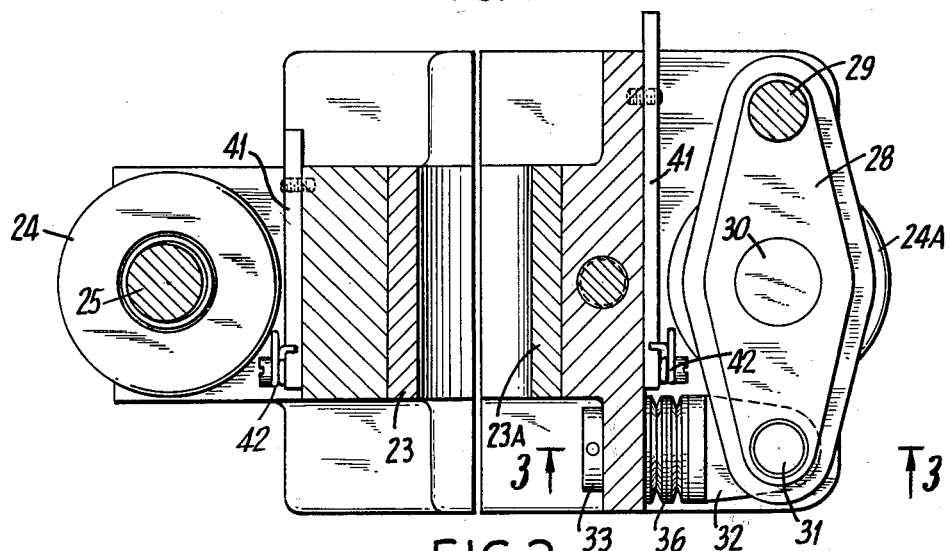
FIG. 2 is a sectional view taken on the line 2—2 of FIG. 1.
Figure 3:
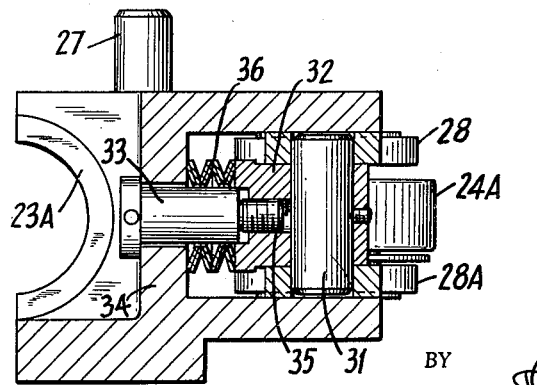
FIG. 3 is a sectional view taken on the line 3—3 of FIG. 2.

In accordance with the instant invention, as detailed in FIGS. 1–3, the cam follower 24A on block 21A is mounted on a pair of parallel lever arms 28, 28A which are pivoted at one end thereof on a vertical stud 29 disposed between the opposed wall portions of the cut out in block 21A. Cam follower 24A rotates on a pin 30 mounted between lever arms 28, 28A. The free ends of lever arms 28, 28A are resiliently disposed by means of a vertical pin 31 mounted between said lever arms; a sleeve 32 on pin 31, an adjusting screw 33 passing through an opening in cutout wall portion 34 and threaded into a recess 35 in sleeve 32. A spring member 36 is disposed about screw 33 and abuts wall portion 34 and sleeve 32.

Cam follower 24 on block 21 is adjustably mounted by the eccentrically disposed vertical shaft 25 on said block. Thus, by turning shaft 25, the relative disposition of cam follower 24 and block 21 may be regulated, for the purpose later appearing. A marker 37 fixed to the upper end of shaft 25 may be related to a scale member 38 to mark the position of shaft 25.

The gripper sleeves 23, 23A are removably mounted on their blocks 24, 24A by means of bolts 39 which are notched at their outer ends as at 40. Levers 41 pivoted to blocks 24, 24A and spring loaded as at 42, engage the notched ends 40 of bolts 39 to retain the same in position. Levers 41 thus may be resiliently lifted to allow removal of the sleeves 23, 23A for replacement with other sleeves of a different inner diameter.

Sleeves 23, 23A are so proportioned that in their adjacent, gripping position, there is a slight gap G between their opposed edge portions, as shown in FIG. 1. Such gap G may be reduced by turning the eccentric shaft 25 to shift the position of cam follower 24 and thus move block 21 closer to block 21A when cam followers 24, 24A engage frame edge portions 17. Turning shaft 25 in the opposite direction will enlarge the gap G. Thus, the initial pressure applied by sleeves 23, 23A to tubing T may be set.

In the event that shaft 25 has not been properly set, or if for any other reason, excessive pressures are applied to tubing T by sleeves 23, 23A; then spring member 36 is effective to relieve such pressures, permitting cam follower 24A to move inwardly by way of the lever arms 28, 28A. Spring member 36 is preloaded by adjusting screw 33.

Thus, the grippers 12, 12A are initially and automatically adjustable to suit various conditions relating to the draw off of tubing T as the same passes between welding station W and the corrugating station C, to insure against slippage of tubing T in the sleeves 23. Also, the pressure of such sleeves on the walls of said tubing T is regulated so as to avoid crushing forces during the gripping action. Thus, any slight variations in the thickness of the metal forming tubing T, is compensated by the device herein disclosed to insure the production of tubing having optimum seams free of torsionally induced stresses, and a wall structure free from deformation.

As various changes might be made in the embodiment of the invention herein disclosed without departing from the spirit thereof, it is understood that all matter herein shown or described shall be deemed illustrative and not limiting except as set forth in the appended claims.

What is claimed is:

1. A device for gripping metal tubing moving between longitudinally spaced stations comprising a frame having a longitudinal opening defined by opposed fixed camming edges, tubing gripper assemblies, means for moving said assemblies in said opening, each assembly comprising a pair of opposed gripper means arranged for movement toward each other to grip said moving tubing, each gripper means including a mounting member and cam follower means movably mounted on said mounting member for engaging the camming edges of said frame, means on one of said mounting members for adjusting the position of the associated cam follower to a selected position on said mounting member and in fixed relation to the associated camming edge and means for resiliently mounting the other of said cam follower means on its associated mounting member in resiliently related relation to the associated camming edge whereby to adjust the gripping action of said gripper means on said tubing.

2. Tubing gripping means comprising a base plate, a pair of blocks slidably mounted on said plate for movement toward each other, each block being formed with a semicircular cutout on the inner edge thereof, a semicircular gripper sleeve in each cutout in said blocks, a cam follower member on the outer edge of each of said blocks, means for independently adjusting the position of each of said cam follower members relative to its associated block.

3. Tubing gripping means comprising a base plate, a pair of blocks slidably mounted on said plate in opposed relation for movement toward and away from each other, each block being formed on its inner edge with a semicircular cutout, a semicircular gripper sleeve mounted in the cutout of each block, each of said blocks being formed on its outer edge with a cutout, a rotatable cam follower member mounted in the cutouts on the outer edge portions of each block, eccentrically disposed shaft means on one block for mounting the cam follower member associated therewith, pivoted lever means on the other block for mounting the cam follower member associated therewith, and resilient means connecting the free end of said lever means with said block to resiliently adjust the position of said second mentioned cam follower member relative to said associated block.

4. Gripping means as in claim 3 and further including means for removably mounting each gripper sleeve in the cutout of the associated block, and movable means for retaining said gripper sleeves in said blocks.

5. Gripping means as in claim 4 wherein said sleeve mounting means comprises an elongated member engaged at one end thereof with said sleeve, said elongated member passing through an opening in a wall portion of said block, the other end of said elongated member being notched, and spring pressed keeper means engageable with the notched portion of said elongated member.

6. Gripping means as in claim 2, wherein the positioning means for one cam follower member comprises eccentric means for selectively locating said one cam follower member relative to its associated block and the positioning means for the other cam follower member comprises resilient means for resiliently locating the other cam follower member relative to its associated block.

References Cited in the file of this patent

UNITED STATES PATENTS

| | | |
|---|---|---|
| 1,978,303 | Guett | Oct. 23, 1934 |
| 2,339,761 | Bruestle | Jan. 25, 1944 |
| 2,495,885 | Blume | Jan. 31, 1950 |
| 3,023,300 | Lehnert | Feb. 27, 1962 |